United States Patent

[11] 3,584,278

[72] Inventor Ulrik Krabbe
 Helsingor, Denmark
[21] Appl. No. 778,717
[22] Filed Nov. 25, 1968
[45] Patented June 8, 1971
[73] Assignee Allmanna Svenska Elektriska Aktiebolaget
 Vasteras, Sweden
[32] Priority Nov. 24, 1967
[33] Sweden
[31] 16128/67

[54] DRIVING MEANS FOR CRANES AND THE LIKE
 1 Claim, 2 Drawing Figs.
[52] U.S. Cl. .................................................. 318/224,
 318/227
[51] Int. Cl. .................................................. H02p 1/38
[50] Field of Search .................................... 318/224,
 225, 227, 202, 203, 204

[56] References Cited
 UNITED STATES PATENTS
| | | | |
|---|---|---|---|
| 3,368,073 | 2/1968 | Baughman | 318/225 |
| 3,391,319 | 7/1968 | Quinn | 318/225 |
| 2,793,339 | 5/1957 | Rhyne, Jr. | 318/224 |
| 3,408,550 | 10/1968 | Graham | 318/212 |
| 3,430,122 | 2/1969 | Krabbe et al. | 318/203 |

Primary Examiner—Oris L. Rader
Assistant Examiner—K. L. Crosson
Attorney—Jennings Bailey, Jr.

ABSTRACT: A driving system for cranes includes a three phase asynchronous motor with a squirrel cage rotor and two stator windings with different numbers of poles. The speed is steplessly controllable within a lower speed range below the synchronous speed corresponding to the higher number of poles in response to the difference between actual and desired speed. This difference quantity passes unidirectional means which, depending on its sign, feeds it as a control signal to a delay angle current varying device inserted between the low speed stator winding and the network, or to a controlled DC source which, during operation in the lower speed range, is connected to the high speed winding, that is, the stator winding with a lower number of poles. This winding is by means of a throwover switch also connectable to the network, in which case the signal circuit of the delay angle current device is intended to be broken by means of a signal current breaker so that no current is fed to the low speed stator winding.

PATENTED JUN 8 1971

3,584,278

INVENTOR.
ULRIK KRABBE
BY
Jennings Bailey Jr 3,584,278

DRIVING MEANS FOR CRANES AND THE LIKE

BACKGROUND OF THE INVENTION

1. Field of the Invention

The present invention relates to a driving means for cranes and the like including an asynchronous motor with a short circuited rotor winding, a controlled static converter connected to an alternating current network to drive the asynchronous motor with and adjustable average voltage of constant frequency, a controlled rectifier intended to brake the direct current of said asynchronous motor, a tachometer means and a comparison device which is arranged to supply a signal representing the difference between the desired and actual speed either to a control device intended for the driving system or one for the braking system, said control angle device being dependent on whether said difference is positive or negative, wherein in a manner known per se direct current braking takes place only when the power of the driving system has fallen below a certain minimum value.

2. The Prior Art

In such a known device a converter is used connected to the stator winding to drive the motor over the entire speed range so that stepless speed control is obtained both with positive and negative torque from low speed to full speed.

The disadvantage of the known device is that the rotor losses at low speed and positive torque or at high speed and negative torque (direct current braking) are considerable so that the rotor must be dimensioned for intensive cooling.

SUMMARY OF THE INVENTION

By means of a device according to the invention it is possible to reduce the problem of the rotor heating considerably. This is achieved by consistently exploiting the fact that stepless speed control—which with a hoisting crane is of great importance at low speeds, for example for careful lowering of the load—on the other hand is not necessary at high speed and that no finely graduated step control is necessary in the upper part of the speed range. It is thus quite sufficient to provide a single step from approximately half speed to maximum operating speed.

A driving means according to the invention is characterized in that the asynchronous motor is provided with a first stator winding connected to said converter, the stator winding having a certain pole number, and a second stator winding having a lower pole number which, by means of a switching device, is arranged to be selectively supplied with alternating current from said alternating current network or direct current from said rectifier intended to brake the direct current, the current supply to said first stator winding being blocked when said second stator winding is supplied with alternating current.

BRIEF DESCRIPTION OF THE DRAWING

In the following the invention will be described with reference to the accompanying schematical drawings where.

DESCRIPTION OF THE PREFERRED EMBODIMENTS

Figure 1:
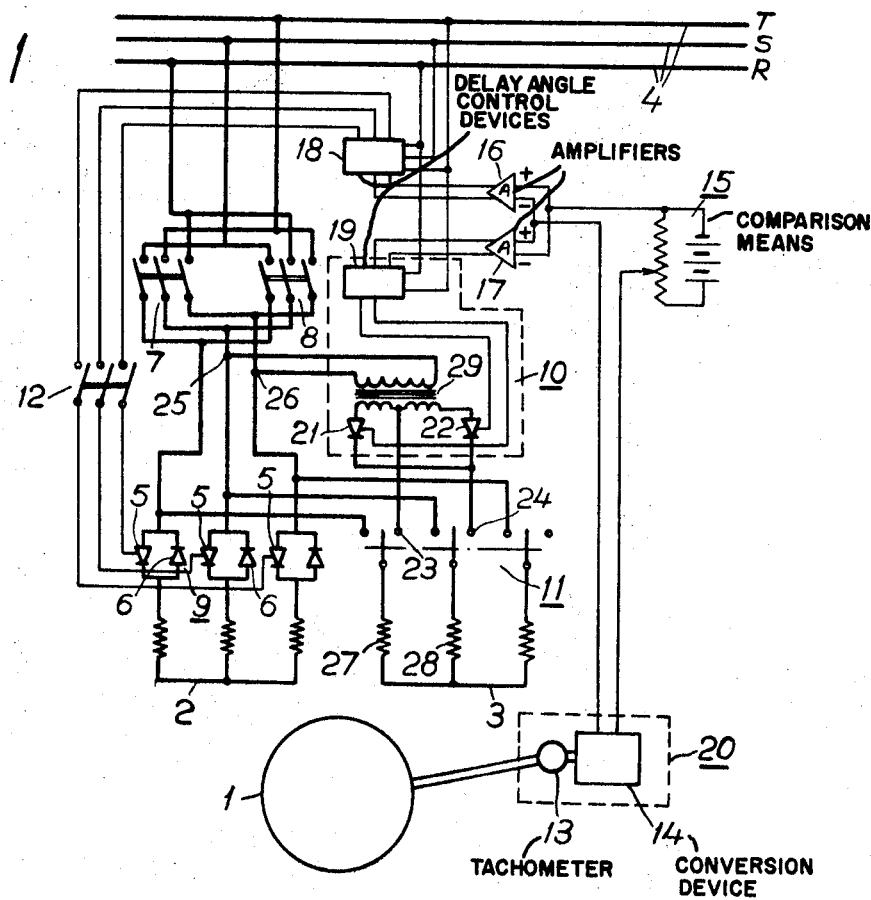
FIG. 1 shows one embodiment of the invention and FIG. 2 curves for comparison between rotor losses in the known driving means and in a means according to the invention.

In FIG. 1, 1 designates a squirrel cage rotor of an asynchronous machine which is provided with two stator windings 2 and 3 provided with the pole numbers eight and four, respectively.

The stator winding 2, which is intended for operation up to 50 percent of the maximum speed, is connectable to the three phase alternating current network 4 by means of two contactors 7 and 8, and a converter 9 consisting of three thyristors 5 and three diodes 6.

The direction of rotation can be selected by closing one or the other of the contactors 7 and 8. The converter 9 is controlled in such a way that the average value of the alternating voltage delivered to the stator winding 2 is adjustable.

The stator winding 3 is intended to be used as a braking winding during speed control in the lower half of the speed range and is then connected to a DC power source 10. In FIG. 1 this DC source is a converter of conventional type comprising a transformer 29, two controlled rectifiers 21 and 22, DC output terminals 23 and 24, AC input terminals 25 and 26 and a delay angle device 19 which is connected with the AC network 4 and furnished with terminals 27 and 28 for the control magnitude. A DC source of this kind is shown in General Electric "Silicon Controlled Rectifier Manual," 1964, third edition, page 140 in combination with FIG. 4.26, page 64. When the highest speed is desired the winding 3 is connected instead to the alternating current network with the help of the switchover means 11. The current supply to the winding 2 is broken simultaneously by opening the switch 12 so that the thyristors 5 are blocked. A tachometer means 13 of known type expresses the speed of the rotor in the form of the frequency of a voltage generated by the tachometer means, which frequency is supplied to a device 14 (See FIG. 1 of German Pat. No. 1,166,365) for conversion to a voltage proportional to the frequency. Thus the means 13 and 14 together constitute a transducer means 20 for expressing the motor speed in the form of an output voltage proportional to the speed. This voltage is compared in the comparison means 15 (FIG. 9.5, pages 298, "Electrical Control Systems in Industry" by Charles S. Siskind, McGraw-Hill Book Company, N.Y., 1963) with a reference value corresponding to the desired speed of the motor. From the means 15 the difference between the compared magnitudes is supplied to each of the amplifiers 16 and 17 which are only receptive for input magnitudes of a certain polarity and connected to the means 15 in such a way that one of them only amplifies positive values of said difference and the other only negative values. The amplifier 16 belongs to the control circuit of the driving system and the amplifier 17 belongs to the control circuit of the braking system. The amplifier 16 is connected by its output side to the input side of a delay angle control device 18 (Pat. No. 3,430,122 or General Electric "Silicon Controlled Rectifier Manual," third edition, 1964, pages 150—152) which delivers a control signal dependent on the speed to the thyristors 5 in such a way that the conductive interval of the thyristors 5 increases when the motor speed shows a tendency to fall below that set by the means 15 and vice versa. Similarly the amplifier 17 is connected to the delay angle control device 19 which, when the motor speed is higher than desired, gives the thyristors in the controlled DC current source 10 a longer or shorter conducting interval. For example, if a sudden change of the reference value corresponding to the setting of a desired considerably lower driving speed is undertaken, a sudden change of sign of the difference value delivered by the device 15 takes place. If the output current of the controlled DC source 10 is strictly proportional to the control magnitude delivered to the amplifier 17, braking always begins as soon as the sign of said difference changes, that is at the same moment as the power supplied to the winding 2 has been reduced to zero. However, an approximate proportionality between the output of the controlled DC source and the input of the amplifier 17 is sufficient. Thus the braking may start at a minimum driving power value which differs from zero. However, in such cases, when driving power and braking power occur simultaneously, both of them have such small values that this has no harmful effect as regards the thermal conditions of the driving system.

If a greater speed than 50 percent is desired, the setting of this speed involves a manipulation by which the switchover means 11 are set to connect the winding 3 to the AC network and the switch 12 is opened. As long as the speed set by the means 15 does not exceed 50 percent of the maximum speed of the driving means, the winding 3 is connected to the direct current side of the controlled DC source 10 with two phases 27 and 28 through which a braking current flows which is approximately proportional to the difference value delivered by the means 15 and 17. The DC current through the two phases 27 and 28 produces a stationary magnetic field in the asynchronous motor which in turn induces a current in the rotor winding, so that a braking torque acts upon the rotor.

Comparing said known driving system having stepless control in the entire speed range with that described above, it is seen that while the rotor losses at full torque and 10 percent of synchronous speed are 0.0·P in the first case, the corresponding rotor losses in a driving means according to the invention having the same speed range and torque are 0.8·P/2, where P is the product of torque and synchronous speed at the highest speed. Thus the rotor losses at this speed are reduced to less than half. At approximately half speed the known connection gives P/2 and the new connection gives only 10 percent of P/2, if the time-lag is approximately 10 percent. Corresponding conditions prevail for direct current braking. At half speed and negative torque with the new connection refeeding of the braking effect to the network is obtained.

The new connection has also the advantage that the rated power of the thyristors is reduced to half and their intermittence time is reduced.

Figure 2:
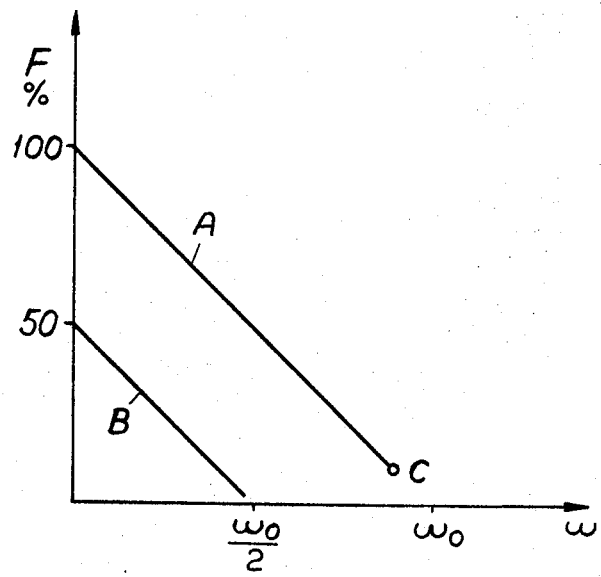

In FIG. 2 the known driving means discussed above is compared with the stepless part of that described in FIG. 1 regarding the rotor losses, the same speed range and same maximum driving torque being assumed for both the driving means.

The rotor losses F are expressed as a percentage of the maximum losses in the known motor and indicated along the ordinate axis, whereas the speeds of the rotors are designated $\omega$ and indicated along the abscissa axis, $\omega_0$ designating synchronous speed of the motor in the known means having only one pole number. The curve A is for the motor in the known means and the curve B for the motor in a means according to the invention. The highest speed in the latter means corresponds approximately to point C on the curve A. It is clear that the rotor losses in the lower part of the total speed range are considerably less in the new driving means than in the known ones.

Comparing the motors of the known and the new means it is seen that the latter requires greater copper space in the stator since in addition to the two-pole winding (which may be dimensioned in the same way as the stator winding of the known driving means) there must be a four-pole winding which means that the stator in the new driving means must be dimensioned with a larger outer diameter than the stator in the known means. However, in the type of driving means concerned it is not operation at full power but operation at reduced speed and braking which cause the greatest thermal stresses. It is thus most important to limit the rotor losses. From the above comparison it is clear that this is effectively achieved by means of the invention. The result is that with a driving means according to the invention a motor can be used which is considerably cheaper to manufacture than a corresponding motor in the known means. Furthermore, cheaper thyristor equipment can also be used.

I claim:

1. A driving system for cranes and the like comprising a three phase asynchronous electric motor with a squirrel cage and first and second stator windings having a higher and lower number of poles, respectively, a three phase feeding network, a three phase sequence reversing device, a three phase change over switch, a three phase delay angle controlled current varying device comprising a group of antiparallel-connected rectifiers interposed in each phase and control means for simultaneous electrical control of said groups, a control signal breaker for said groups, said groups being connected between the network and the terminals of said first stator winding by means of said reversing device, a controllable DC current source and control means for said current source, said second stator winding being selectively connectable to said network or to said DC current source by means of said change over switch for driving in a higher part of the motor speed range or braking in a lower part, respectively, said driving system further comprising transducer means to express the motor speed in the form of an output quantity, means to supply a reference quantity and to compare the reference quantity with said output quantity to form a difference quantity, and means to supply the numerical value of said difference quantity alternatively as an input to the delay angle or the DC current control means in dependence on the sign of said difference quantity to effect driving or braking respectively in said lower speed range.